April 1, 1969 K. ENGELS 3,436,570
ELECTRIC MOTOR WITH PERMANENT MAGNET ROTOR HAVING
A FLUID IMPELLER AND HOLLOW BEARING
Filed Feb. 8, 1966
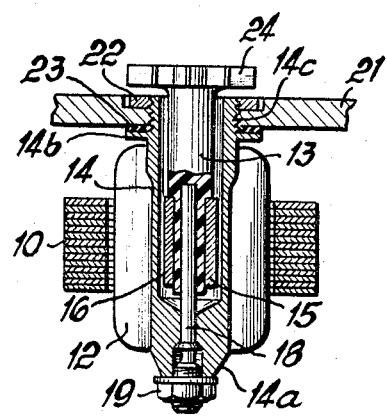
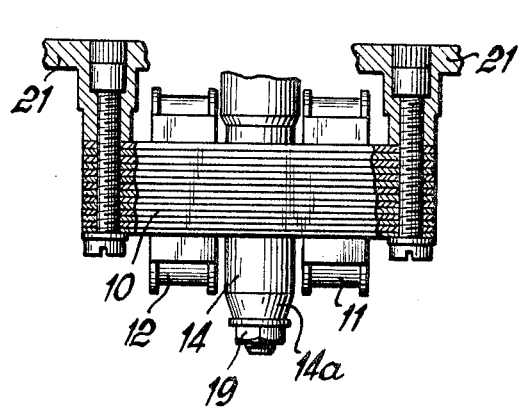
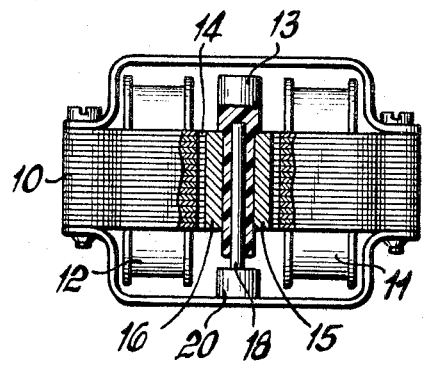
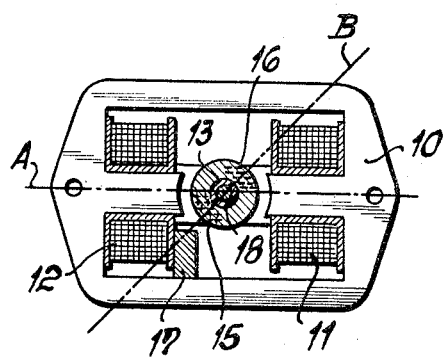
INVENTOR
Kurt Engels
By Ernest G Montague
attorney

United States Patent Office 3,436,570
Patented Apr. 1, 1969

3,436,570
ELECTRIC MOTOR WITH PERMANENT MAGNET ROTOR HAVING A FLUID IMPELLER AND HOLLOW BEARING
Kurt Engels, Schmurstrasse 30, Wuppertal-Barmen, Germany
Filed Feb. 8, 1966, Ser. No. 525,946
Int. Cl. H02k 5/16
U.S. Cl. 310—46                 7 Claims

ABSTRACT OF THE DISCLOSURE

An electromagnetic driving unit or motor comprising two coils, spaced apart from each other, creating a magnetic field upon excitement on both sides of a common polarization axis. An armature, charged positively at one peripheral portion and negatively at an opposed peripheral portion, defining a pole axis, is rotatably mounted between the coils. A hollow bearing is secured between the coils and a bearing axle extends centrally therein on which the armature is mounted rotatably relative the hollow bearing on one side thereof. An aligning magnet is secured outside the polarization axis which causes, in the inoperative condition, a rotation of the armature to a rest position such that the pole axis of the armature is positioned at an acute angle relative the polarization axis of the coils. A fluid impeller may be provided on the end of the armature.

---

The present invention relates to an electromagnetic driving unit or motor in which two coils are provided, which coils are disposed spaced apart from each other and which create a magnetic field on both sides of its common polarization axis upon excitement, and an armature is rotatably mounted between the two coils.

It is one object of the present invention to provide an electromagnetic driving unit which is designed in a particularly suitable, as well as an effective manner.

It is another object of the present invention to provide an electromagnetic driving unit wherein an opposite pole armature is provided which at least along part of its axial and peripheral length is positively charged, and which is negatively charged on its diametrically opposite peripheral range. One side of the armature is rotatably mounted centrally by a bearing axle, the latter extending centrally and axially into a hollow bearing disposed between the two coils. An aligning magnet is mounted outside of the polarization axis of the two coils and operates upon the pole fields of the armature causing the armature to rotate, in the inoperative state of the driving unit, to a rest position where the pole axis of the armature crosses the polarization axis of the coils at an acute angle.

In this manner there is provided, in spite of an unusually simple structure, an extremely inexpensive driving unit with merely a very small number of individual structural parts which operates reliably and complies with all requirements.

A preferred embodiment of the present invention comprises an arrangement wherein the armature is formed of an axle-shaped core, and an opposite facing pole ring magnet extends over an axial portion of the height of the core, the core consisting of a suitably nonmetallic material, for instance, synthetic material, and the ring magnet, of a material which is magnetizable to form opposite poles. By such an arrangement an outstanding lightweight structure can be realized with such an armature, so that starting of the unit can be effected with slight swinging movements.

The driving unit designed in accordance with the present invention is characterized also by extremely easy operation, is completely free of any service, and is foolproof.

Also, the aligning magnet is of importance, because the latter is disposed in a position to turn the opposite pole armature to its inoperative position such, that it is forced into a starting position. Accordingly, there is avoided during inoperative periods of the driving unit the disadvantageous occurrence of a magnetic dead point position of the armature in which the pole axis of the armature would coincide with the polarization axis of the two coils. In such a position, the armature would not start again.

The aligning magnet insures that the armature is always subjected to a rotation such that it is brought into a starting position in which its pole axis is oriented at an acute angle relative to the polarization axis of the two coils. If thereafter the two coils are excited, the armature starts to run immediately, because the magnetic field between the coils is immediately fully effective in the direction of rotation towards the pole fields of the armature.

Furthermore, the new driving unit designed in accordance with the present invention, is also superior in structure such that the hollow bearing for the armature may be formed by a thin-walled bushing, the bottom of which has an axial projection serving as a bearing- and centering-axle for the armature whereby, for instance, the bottom of the bearing bushing can have in the center an axial reception means for the bearing axle of the armature which freely extends axially into the inside of the bushing and is retained therein at one end.

By this embodiment for mounting the armature, merely a single rotatable carrying bearing point is required, whereby the armature can be simply and axially mounted on the bearing axle and can be retained thereon. It has been found that such a one-sided mounting provides advantages over a double-sided mounting. Also, the thin wall of the bearing bushing offers decisive advantages for safe functioning in view of the effective field of the magnetic lines of force.

Furthermore, it is of importance to the structure of the driving unit that the bearing bushing has on a securing side a radial bearing collar for engagement with a carrier on one side, and axially joined thereto, a threaded branch on which is received a securing nut supporting itself from the opposite side on the carrier.

By this arrangement, it is possible to secure the entire driving unit to a carrier from the bearing bushing. An additional securing can also take place by means of securing screws, which are guided through the stator bundle and which interengage the carrier at one side.

The driving unit, which is characterized by its light and noiseless operation as well as by its structural simplicity, can be applied in practice in many different ways. For example, it can be applied as a turbine drive in room- or home-fountains, as well as in technical flow devices or the like, by forming, on the one hand, the driven end of the armature as a turbine impeller and, on the other hand, the carrier, as a water bowl or the like, in which the bearing bushing is sealingly retained, the bearing bushing being open on one side facing the inside of the bowl for a water entrance constituting a liquid bearing for the armature.

By this application, additionally a liquid support of the armature is achieved, whereby a sealing is assured via the connection of the bushing to the carrier, so that only the bushing is filled with water in the hollow interior of the bearing, while the electromagnetic portion, disposed on the outside thereof, cannot be subjected to any disturbances caused by the liquid.

The entire driving unit constitutes, in summary, an extremely compact structure which can be built by the combination of all functional and structural elements in the narrowest space, even in spatially narrow locations, even within the smallest flow devices.

With these and other objects in view which will become apparent in the following detailed description, the present invention will be clearly understood in connection with the accompanying drawings, in which:

FIGURE 1 is an axial section of a driving unit, designed in accordance with the present invention, in which the armature is formed as an impeller;

FIG. 2 is an elevation, partly in section, of the driving unit disclosed in FIG. 1, yet set-off for 90°;

FIG. 3 is an elevation of another embodiment of the driving unit, partly in section, whereby the armature simply terminates into a coupling pin; and FIG. 4 is a top plan view of a driving unit showing the armature in cross section.

Referring now to the drawings, and in particular to FIGS. 1 and 2, the driving unit comprises a stator bundle 10 inside of which two coils 11 and 12 are disposed in opposite arrangement, defining a polarization axis A. A magnetized armature 13, defining a pole axis B, is rotatably disposed between the two coils 11 and 12 within a hollow bearing 14. The armature 13 is rotatably driven by excitement of the coils 11 and 12.

The armature 13 is made, for example, preferably of synthetic material and carries on its periphery a ring magnet 15 and 16 which is formed as an opposite pole ring magnet, such that it is charged positively on one part 15 of its periphery and height, and is charged negatively on the peripheral section 16 disposed diametrically opposite the positively charged part 15 (as shown in FIG. 4).

Another magnet 17 is immovably secured outside of the polarization axis A of the two coils 11 and 12 (FIG. 4). The magent 17 functions as an aligning magnet such that, when the unit is in the inoperative or deenergized condition, that is, when the coils have no current, the aligning magnet acts upon the pole fields of the armature 13, causing a forced rotation of the armature 13 into a rest position (shown in FIG. 4) in which the pole axis B of the armature 13 crosses the polarization axis A of the coils 11 and 12 at an acute angle. This position simultaneously constitutes the starting position of the device from which the armature can start immediately upon initiating the operation or energization of the driving unit.

The armature 13 is formed preferably, as clearly shown in the drawings, as a hollow axle for a portion of its axial length. It is received at one side, and is rotatably carried, by an immovable bearing axle 18. The bearing axle 18 projects from one side into the hollow part of the axial length of the bearing bushing 14 centrally therein. The axle 18, which is here designed as a standing axle, can be formed integrally of a part of the bottom 14a of the bushing 14, or it can be inserted from the bottom side as a particular distinct structural element and can be secured by means of a nut 19, or the like. Also, the bearing axle 18 can be inserted, as shown in FIG. 3, into a socket-like hub 20 and be retained thereby.

The bearing bushing 14 has, at a secured end, a radial flange or collar 14b which engages, from below, a carrier 21 which receives the driving unit, as shown in FIG. 1 of the drawings. Furthermore, a support 14c, carrying an outer thread, is provided, forming an axial extension of the radially disposed annular collar 14b, which support 14c receives a threaded securing nut 22. Additionally, a disk 23 can be positioned between the radial flange 14b and the carrier 21.

In another embodiment of the present invention, the bearing bushing 14 can be used in the manner shown in FIG. 3. Here the bearing bushing 14 extends over the entire height of the annular magnet 15 and 16. It extends, however, only for about a portion of the height of the coils and has no securing flange, as is shown in the embodiment disclosed in FIG. 1.

The embodiment disclosed in FIGS. 1, 2 and 4 is suitable in particular for application in devices receiving and feeding liquids, as for instance in room fountains, liquid feeding devices for technical laboratories, or the like. The carrier 21 can be formed as a bottom of a water bowl and the armature can have at its driving end an impeller 24 which can be coupled with the armature 13, or, may even form an integral structural unit with the latter.

The bearing bushing 14 is thereby, as shown in the drawings, open, facing the impeller 24 and, thereby, also faces the inside of the bowl, so that water can penetrate into the interior of the bushing through this opening, forming a liquid storage for the armature.

The operation of the electromagnetic driving unit is as follows:

Starting from the rest position of the driving unit in accordance with FIG. 4, a magnetic field force is created between the two coils 11 and 12 upon excitement of the latter. As a consequence, due to its effect upon the pole fields 15 and 16 of the armature 13, the latter is placed into rotation, whereby the driven side of the armature 13, for instance, the impeller 24, becomes operative in a feeding condition. If the driving unit is stopped, that is, if the magnetic force field which was created between the coils 11 and 12 is reduced again, the pole fields 15 and 16 of the opposite pole annular magnet are influenced by the aligning magnet 17 such, that they assume a position corresponding to their polarity relative to the magnet poles of the aligning magnet 17. Since this aligning magnet 17 is disposed outside of the polarization axis A, the armature 13 assumes a position shown in FIG. 4, whereby its pole axis B crosses the polarization axis A between the coils 11 and 12.

It is understood that this driving unit could also deviate from feeding devices and applied for other driving purposes, if the armature is correspondingly designed at its driving side. Finally, the driving unit could be formed in a different manner as to its structural design.

While I have disclosed several embodiments of the present invention, it is to be understood that these embodiments are given by example only and not in a limiting sense, the scope of the present invention being determined by the objects and the claims.

I claim:
1. An electromagnetic driving unit including a stator bundle, comprising:
two coils disposed spaced apart from each other within said stator bundle defining a common polarization axis and creating a magnetic field upon excitement on both sides of said common polarization axis, an armature having opposite poles rotatably mounted between said coils and charged positively at least along parts of its height and its periphery and charged negatively along a peripheral portion disposed diametrically opposite said positively charged parts, said positively and negatively charged parts constituting a positive and negative pole, respectively, and defining a pole axis,
a hollow bearing secured between said two coils,
a bearing axle extending centrally into said hollow interior of said bearing,
said armature coaxially disposed within said hollow interior of said bearing and mounted on one side on said bearing axle rotatably relative said hollow bearing, and
an aligning magnet means secured outside of said polarization axis of said two coils,
said aligning magnet means for causing a rotation of said armature and said poles of said armature to a rest position such, that said pole axis of said armature crosses said polarization axis of said coils at an arcute angle when said driving unit is in an inoperative condition.

2. The driving unit, as set forth in claim 1, wherein said armature comprises:
an axle-shaped core and a ring magnet extending over an axial portion of said core, and
said core is made of non-metallic material and said ring magnet is made of a magnetizable material to form said opposite poles.

3. The driving unit, as set forth in claim 1, wherein:

said hollow bearing for said armature comprises a thin-walled hollow bushing, said armature includes said bearing axle, and said bushing has a bottom portion adapted to operate as a mounting for said bearing axle of said armature.

4. The driving unit, as set forth in claim 3, wherein:
said bottom portion of said bushing includes in the center an axial receiving means rotatably receiving said bearing axle extending axially therefrom into the interior of said bushing and retained thereby from one side.

5. The driving unit, as set forth in claim 3, which includes:

a carrier, said bushing includes a securing end opposite said bottom portion forming a radial bearing collar for engagement with one side of said carrier, a threaded branch extending axially from said collar and having a diameter smaller than that of said collar, and a securing means engaging said threaded branch and supporting itself on said carrier from the opposite side of said carrier.

6. The driving unit, as set forth in claim 5, which includes:

a securing bolt extending through said stator bundle and penetrating into said carrier securing said stator bundle and said carrier together in diametrically opposite arrangement.

7. The driving unit, as set forth in claim 5, wherein:
one end of said armature adjacent to said collar and opposite from said end adjacent said bearing axle is formed as an impeller, said carrier is formed as a water bowl, and said bushing has an open end adjacent said threaded branch communicating with the hollow interior of said bushing and facing towards the inside of said water bowl for water feeding therein constituting a liquid bearing for said armature, said bushing being sealed off towards the outside.

References Cited

UNITED STATES PATENTS

| | | | |
|---|---|---|---|
| 2,483,539 | 10/1949 | Hansen et al. | 310—163 |
| 2,635,547 | 4/1953 | Cataldo | 103—87 |
| 2,796,835 | 6/1957 | White | 103—87 |
| 2,829,286 | 4/1958 | Britz | 310—53 |
| 3,121,815 | 2/1964 | Sidell | 310—164 |
| 3,183,384 | 5/1965 | Flaherty et al. | 310—90 |
| 3,189,771 | 6/1965 | Danek | 310—156 |
| 3,306,221 | 2/1967 | Goodpasture | 103—87 |

WARREN E. RAY, *Primary Examiner.*

U.S. Cl. X.R.

103—87; 259—1, 8; 310—66, 90, 91, 156, 163, 265.